US012803416B2

(12) United States Patent
Huang et al.

(10) Patent No.: US 12,803,416 B2
(45) Date of Patent: Nov. 17, 2026

(54) SINGLE INDUCTOR MULTIPLE OUTPUT CONVERTER WITH AN ENERGY-SAVING MODE

(71) Applicant: Advanced Analog Technology, Inc., Zhubei City (TW)

(72) Inventors: Chih-Liang Huang, Zhubei City (TW); Chih-Chiang Wu, Zhubei City (TW); Yi-Hua Li, Zhubei City (TW); Teng-Liang You, Zhubei City (TW); Chien-Jung Liao, Zhubei City (TW)

(73) Assignee: Advanced Analog Technology, Inc., Zhubei City (TW)

( * ) Notice: Subject to any disclaimer, the term of this patent is extended or adjusted under 35 U.S.C. 154(b) by 159 days.

(21) Appl. No.: 18/912,798

(22) Filed: Oct. 11, 2024

(65) Prior Publication Data

US 2026/0025057 A1 Jan. 22, 2026

(30) Foreign Application Priority Data

Jul. 18, 2024 (TW) ................................ 113126944

(51) Int. Cl.
*H02M 3/158* (2006.01)
*H02M 1/00* (2006.01)

(52) U.S. Cl.
CPC ......... *H02M 1/009* (2021.05); *H02M 1/0032* (2021.05); *H02M 3/158* (2013.01)

(58) Field of Classification Search
CPC ..... H02M 1/0032; H02M 1/009; H02M 3/158
See application file for complete search history.

(56) References Cited

U.S. PATENT DOCUMENTS

2004/0201281 A1* 10/2004 Ma ........................ H02M 3/158 307/38
2005/0264271 A1* 12/2005 Lam ........................ H02M 1/10 323/282
2008/0055946 A1* 3/2008 Lesso .................. H02M 3/1582 363/63
2010/0194359 A1* 8/2010 Notman .............. H02M 3/1588 323/267
2010/0231186 A1* 9/2010 Chen ..................... H02M 3/158 323/282

* cited by examiner

*Primary Examiner* — Gary L Laxton
(74) *Attorney, Agent, or Firm* — MUNCY, GEISSLER, OLDS & LOWE, P.C.

(57) ABSTRACT

A single inductor multi output converter with an energy-saving mode is used to convert an input voltage into an output positive voltage and at least one additional output voltage. It includes a single inductor conversion circuit, an energy-saving switch, a voltage detector, and a conversion control circuit. The voltage detector causes the conversion control circuit to enter normal mode when the input voltage is lower than the output positive voltage, and energy-saving mode when the input voltage is higher or equal. In normal mode, the energy-saving switch is off, and the single inductor conversion circuit outputs the positive and additional voltages. In energy-saving mode, the energy-saving switch is on to directly output the input voltage as the positive output, while the single inductor conversion circuit outputs the additional voltages.

8 Claims, 10 Drawing Sheets

SINGLE INDUCTOR MULTIPLE OUTPUT CONVERTER WITH AN ENERGY-SAVING MODE

CROSS-REFERENCE TO RELATED APPLICATIONS

This application claims the priority benefit of Taiwan application serial No. 113126944, filed on Jul. 18, 2024. The entirety of the above-mentioned patent application is hereby incorporated by reference herein and made a part of the specification.

BACKGROUND OF THE INVENTION

(1) Field of the Invention

The present invention relates to a single inductor multiple output converter, and in particular to a single inductor multiple output converter with an energy-saving operation mode.

(2) Description of the Prior Art

SIMO (Single Inductor Multiple Output Converter) uses only one inductor to convert an input voltage into multiple different output voltages.

Compared with multiple inductor multiple output converters, single inductor multiple output converters have the advantages of small size and relatively low cost. Therefore, single inductor multiple output converters are mostly used in mobile devices, wearable devices or display devices.

The basic principle of a single inductor multiple output converter is to control the switching of multiple switching elements to regulate the storage and release of electrical energy in the inductor, thereby controlling the output voltage. At the same time, the feedback control circuit monitors and controls the output voltage, and accurately adjusts the switching sequence of the switching elements to maintain the stability of the output voltage.

However, when a single inductor multiple output converter is operating, the switching of switching elements will inevitably cause power consumption and energy loss, which means that there is a common problem of low conversion efficiency.

SUMMARY OF THE INVENTION

In view of the common problem in the prior art, the conversion efficiency of single inductor multiple output converter is not so effective. The main purpose of the present invention is to provide a single inductor multiple output converter with an energy-saving operation mode. When the input voltage is greater than or equal to the output positive voltage, the energy-saving switch is turned on to directly output the input voltage as the output positive voltage to reduce the number of switching times of the inductor control switch within a control cycle, and to solve the above problems.

Accordingly, the necessary technical means adopted by the present invention to solve the problems of the prior art is to provide a single inductor multiple output converter with an energy-saving operation mode (hereinafter referred to as the "single inductor multiple output converter"), which is used to convert an input voltage of a voltage input source into an output positive voltage and at least one additional output voltage lower than the output positive voltage, and then output them to a positive voltage output source and at least one additional voltage output source respectively. The single inductor multiple output converter includes a single inductor conversion circuit, energy-saving switch, a voltage detector and a conversion control circuit.

The single inductor conversion circuit is electrically connected to the voltage input source, the positive voltage output source and the additional voltage output source, and is used to convert the input voltage into an output positive voltage and at least one additional output voltage. Preferably, the single inductor conversion circuit may include an inductor and a plurality of inductor control switches. The inductor has a current inflow side and a current outflow side, and during operation, an inductor current flows from the current inflow side to the current outflow side. The inductor control switch is controlled to be turned on or off to repeatedly charge and discharge the inductor, thereby converting the input voltage into an output positive voltage and at least one additional output voltage.

The energy-saving switch is electrically connected to the voltage input source and the positive voltage output source, and is used to directly output the input voltage as the output positive voltage to the positive voltage output source when it is turned on. The voltage detector is electrically connected to the voltage input source and the positive voltage output source, and is used to send a normal operation signal when the input voltage is detected to be less than the output positive voltage, and to send an energy-saving operation signal when the input voltage is detected to be greater than or equal to the output positive voltage.

The conversion control circuit is electrically connected to the single inductor conversion circuit, the energy-saving switch and the voltage detector, and enters the normal operation mode and the energy-saving operation mode respectively when receiving the normal operation signal and the energy-saving operation signal, and, in the normal operation mode, is used to send a positive voltage control command and at least one additional voltage control command to the single inductor conversion circuit after sending a switch cut-off control command to cut off the energy-saving switch, and, in the energy-saving operation mode, is used to send at least one additional voltage control command to the single inductor conversion circuit after sending a switch turn-on control command to turn on the energy-saving switch.

In order to distinguish commands at different phases within a control cycle, preferably, the positive voltage control command includes a plurality of positive voltage control subcommands arranged according to a positive voltage control sequence, and at least one additional voltage control command includes a plurality of additional voltage control subcommands arranged according to at least one additional voltage control sequence.

In the normal operation mode, the single inductor conversion circuit operates according to the positive voltage control command and at least one additional voltage control command to output the positive voltage and the at least one additional output voltage to the positive voltage output source and the at least one additional voltage output source respectively. In energy-saving operation mode, the input voltage is directly output to the positive voltage output source as the output positive voltage, and the single inductor conversion circuit operates according to at least one additional voltage control command and outputs at least one additional output voltage to at least one additional voltage output source.

In order to improve the efficiency of the conversion control circuit, preferably, the single inductor multiple output converter may further include a feedback control circuit, which is electrically connected to the single inductor conversion circuit, the conversion control circuit, the positive voltage output source and an additional voltage output source, and is used to send a feedback control signal to the conversion control circuit.

Preferably, the conversion control circuit may also include a switch logic control circuit and a switch drive circuit. The switch logic control circuit is electrically connected to the voltage detector and the feedback control circuit respectively, and is used to generate the switch off control command and the switch on control command respectively according to the normal operation signal and the energy-saving operation signal, and is used to generate a positive voltage control command and at least one additional voltage control command according to the feedback control signal.

The switch drive circuit is electrically connected to the switch logic control circuit, the energy-saving switch and some inductance control switches respectively, and is used to drive the energy-saving switch to turn off or on according to the switch off control command and the switch on control command, and is used to drive some inductance control switches to turn off or on according to the positive voltage control command and at least one additional voltage control command.

Based on the above necessary technical means, the following subsidiary technical means can be derived. In order to reduce the ripple generated during operation, preferably, the single inductor multiple output converter may further include a plurality of voltage regulators and a plurality of loads electrically connected to the above voltage regulators. The above voltage regulators are electrically connected to a positive voltage output source and at least one additional voltage output source. Preferably, the above voltage regulators are all LDR (Low-Dropout Regulator). In order to filter, eliminate high-frequency noise or store energy, preferably, the single inductor multiple output converter can also include a plurality of voltage stabilizing capacitors.

Based on the above said, the single inductor multiple output converter with energy-saving operation mode provided by the present invention turns on the energy-saving switch when the input voltage is greater than or equal to the output positive voltage, so as to directly output the input voltage as the output positive voltage, thereby reducing the number of switching times of the inductor control switch within a control cycle, thus solving the above problems.

The specific embodiments used in the present invention will be further explained through the following embodiments and figures.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a single inductor multiple output converter with an energy-saving operation mode. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Since the single inductor multiple output converter with energy-saving operation mode provided by the present invention can be widely used in various circuit structures, it will not be described in detail here. Only one of the better embodiments is illustrated for detailed description, and this embodiment is only used to conveniently and clearly assist in explaining the purpose and effect of the embodiment of the present invention.

Figure 1:
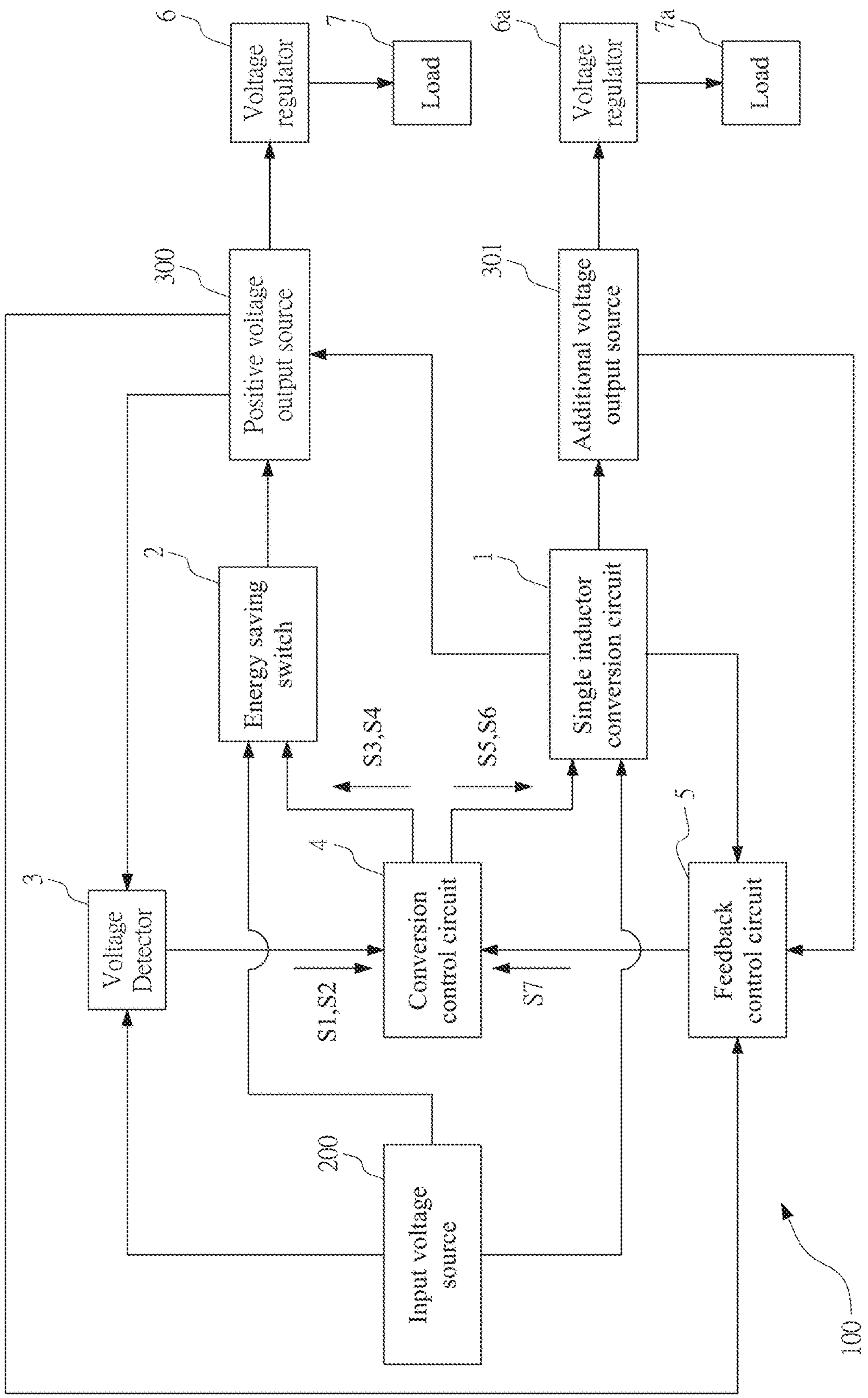
FIG. 1 is a system block diagram illustrating a single inductor multiple output converter with an energy-saving operation mode provided by the present invention.

Referring to the FIG. 1, the FIG. 1 is a system block diagram illustrating a single inductor multiple output converter with an energy-saving operation mode provided by the present invention. As shown in the FIG. 1, a single inductor multiple output converter (hereinafter referred to as "single inductor multiple output converter") 100 with an energy-saving operating mode is used to convert an input voltage Vin of a voltage input source 200 into an output positive voltage Vop and at least one additional output voltage lower than the output positive voltage Vop, and then output them to a positive voltage output source 300 and at least one additional voltage output source respectively.

In this embodiment, the at least one additional output voltage only includes an additional output voltage Von, the at least one additional output voltage source only includes an additional output voltage source 301, and the additional output voltage Von is correspondingly output to the additional output voltage source 301. In other embodiments, the single inductor multiple output converter 100 converts the input voltage Vin into a plurality of additional output voltages of different voltages and then outputs them to a plurality of additional voltage output sources respectively.

In addition, in this embodiment, the additional output voltage Von is lower than zero, and, in other words, the additional output voltage Von is an output negative voltage. According to different practical applications, in other embodiments, the additional output voltage Von may be higher than zero and lower than the output positive voltage Vop.

In this embodiment, the single inductor multiple output converter 100 includes a single inductor conversion circuit 1, an energy-saving switch 2, a voltage detector 3, a conversion control circuit 4, a feedback control circuit 5, two stable Voltages 6 and 6*a* and two loads 7 and 7*a*.

The single inductor conversion circuit 1 is electrically connected to the voltage input source 200, the positive voltage output source 300 and the additional voltage output source 301 respectively, for converting the input voltage Vin into an output positive voltage Vop and an additional output voltage Von. The energy-saving switch 2 is electrically connected to the voltage input source 200 and the positive voltage output source 300 respectively, and is used to directly output the input voltage Vin as the output positive voltage Vop to the positive voltage output source 300 when the energy-saving switch 2 is turned on.

The voltage detector 3 is electrically connected to the voltage input source 200, the positive voltage output source 300 and the conversion control circuit 4 respectively, and is used to send a normal operation signal S1 to the conversion control circuit 4 when it detects that the input voltage Vin is less than the output positive voltage Vop, so that the conversion control circuit 4 enters a normal operation mode. The voltage detector 3 is used to send the energy-saving operation signal S2 to the conversion control circuit 4 when it detects that the input voltage Vin is greater than or equal to the output positive voltage Vop, so that the conversion control circuit 4 enters the energy-saving operation mode. In this embodiment, the conversion control circuit 4 uses the voltage variation of the voltage detector output voltage Vdv output by the voltage detector 3 to distinguish the normal operation signal S1 and the energy-saving operation signal S2.

The conversion control circuit 4 is electrically connected to the single inductor conversion circuit 1, the energy-saving switch 2 and the voltage detector 3 respectively. In the normal operation mode, a switch cut-off control command S3 is first sent to the energy-saving switch 2 to cut off the energy-saving switch 2, and then a positive voltage control command S5 and at least one additional voltage control command (in this embodiment, only one additional voltage control command S6 is included) are sent to the single inductor conversion circuit 1. In the energy-saving operation mode, a switch turn-on control command S4 is first sent to the energy-saving switch 2 to turn on the energy-saving switch 2, and then an additional voltage control command S6 is sent to the single inductor conversion circuit 1.

The feedback control circuit 5 is electrically connected to the single inductor conversion circuit 1, the conversion control circuit 4, the positive voltage output source 300 and the additional voltage output source 301 respectively, for sending a feedback control signal S7 to the conversion control circuit 4. The method of generating the feedback control signal S7 will be explained in the subsequent paragraphs.

The voltage regulator 6 is electrically connected to the positive voltage output source 300 and the load 7 respectively. The voltage regulator 6*a* is electrically connected to the additional voltage output source 301 and the load 7*a* respectively. In this embodiment, the voltage regulators 6 and 6*a* are both LDR (Low-Dropout Regulators), used to reduce the ripple generated by the single inductor multiple output converter 100 during operation. The structure and working principle of the low dropout voltage regulator are not claimed by this invention and will not be described again in this embodiment.

Figure 2:
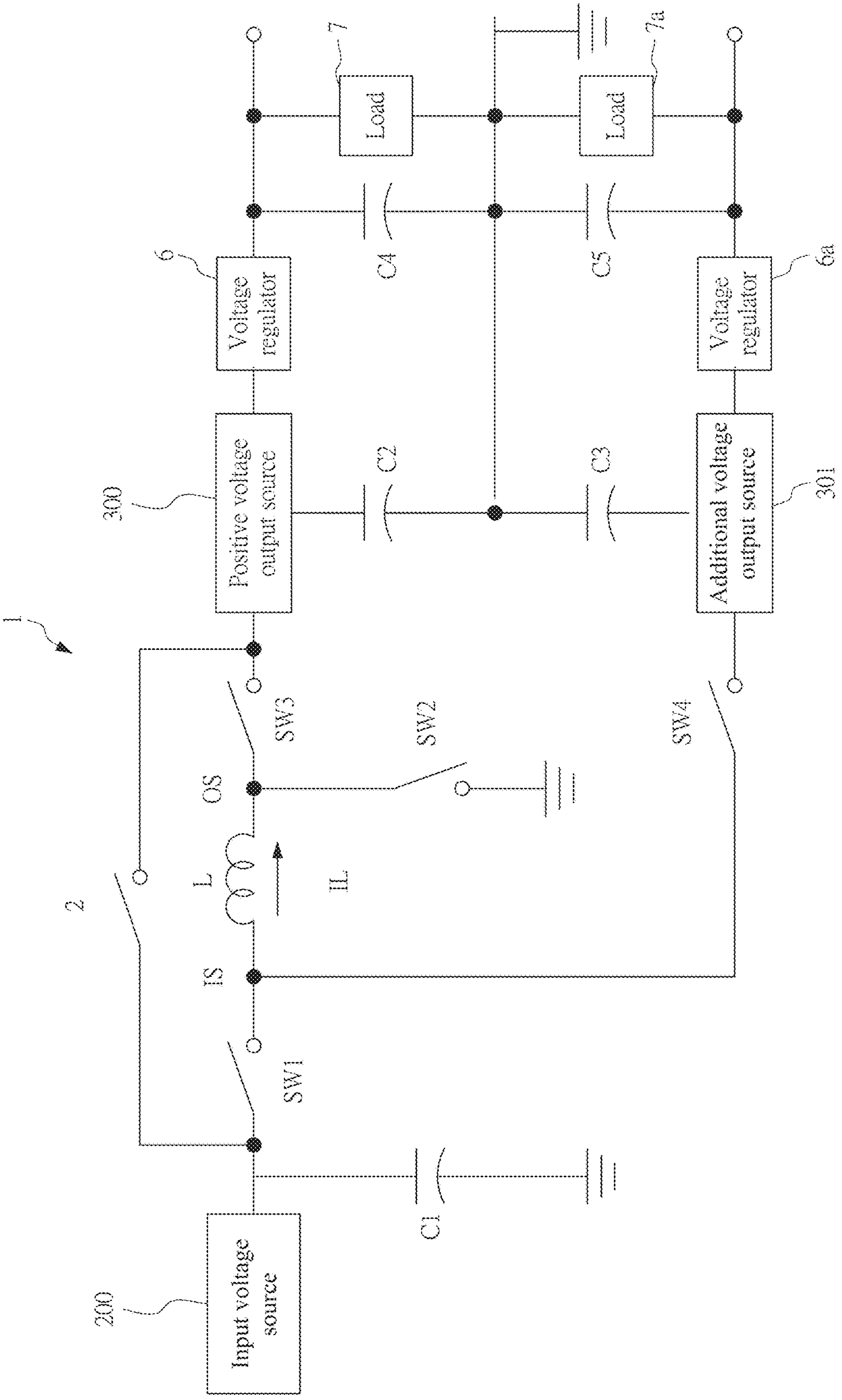
FIG. 2 is a circuit diagram illustrating a single inductor conversion circuit with an energy-saving operation mode provided by the present invention.

Referring to the FIG. 2, the FIG. 2 is a circuit diagram illustrating a single inductor conversion circuit with an energy-saving operation mode provided by the present invention. As shown in the FIG. 2, in this embodiment, the single inductor multiple output converter 100 includes a plurality of stabilizing capacitors C1 to C5. The voltage stabilizing capacitor C1 has one end disposed adjacent to the voltage input source 200 and the other end grounded. The stabilizing capacitor C2 has one end disposed adjacent to the positive voltage output source 300 and the other end grounded. The stabilizing capacitor C3 has one end disposed adjacent to the additional voltage output source 301 and the other end grounded. The voltage stabilizing capacitor C4 has one end adjacent to the load 7 and is arranged in parallel with the load 7 and the other end grounded. The stabilizing capacitor C5 has one end adjacent to the load 7*a* and is arranged in parallel with the load 7*a*, and the other end grounded.

In other embodiments, the single inductor multiple output converter 100 may include different numbers of stabilizing capacitors according to actual needs, and they may be set at different positions in the converter. In the circuit structure, the voltage stabilizing capacitor is used to filter, eliminate high-frequency noise or store energy. The structure and working principle of the voltage stabilizing capacitor are not claimed by the present invention and will not be described again in this embodiment.

As shown in the FIG. 2, in this embodiment, the single inductor conversion circuit 1 includes an inductor L and a plurality of inductor control switches SW1 to SW4. The inductor L has a current inflow side IS and a current outflow side OS. When the single inductor multiple output converter 100 is operating, the inductor L generates an inductor current IL, and the inductor current IL flows from the current inflow side IS to the current outflow side OS. The inductor control switches SW1 to SW4 are controlled on or off to repeatedly charge and discharge the inductor L, thereby converting the input voltage Vin into an output positive voltage Vop and an additional output voltage Von.

The two ends of the inductor control switch SW1 are electrically connected to the current inflow side IS of the inductor L and the voltage input source 200 respectively. One end of the inductor control switch SW2 is electrically connected to the current outflow side OS of the inductor L, and the other end is grounded. The two ends of the inductor control switch SW3 are electrically connected to the current outflow side OS of the inductor L and the positive voltage output source 300 respectively. The two ends of the inductor control switch SW4 are electrically connected to the current inflow side IS of the inductor L and the additional voltage output source 301 respectively.

The control sequence of the inductor control switches SW1 to SW4 will be explained in the subsequent paragraphs. In addition, in other embodiments, the single inductor conversion circuit 1 may not include the inductor control switches SW1 to SW4 and may be replaced by other components or circuits with functions similar to switches.

Figure 3A:
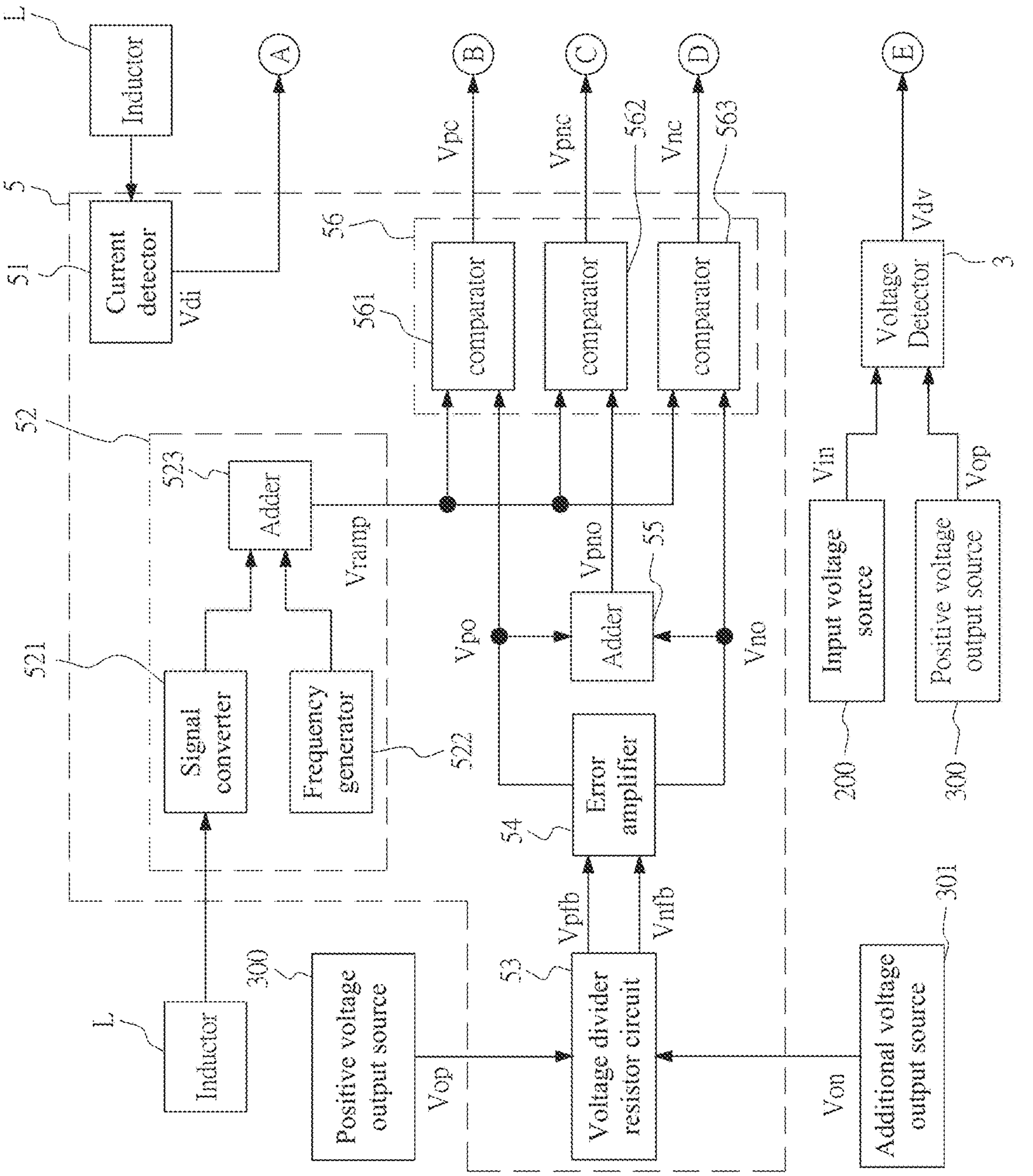
FIG. 3A and FIG. 3B are circuit diagrams illustrating the feedback control circuit with energy-saving operation mode provided by the present invention.
Figure 3B:
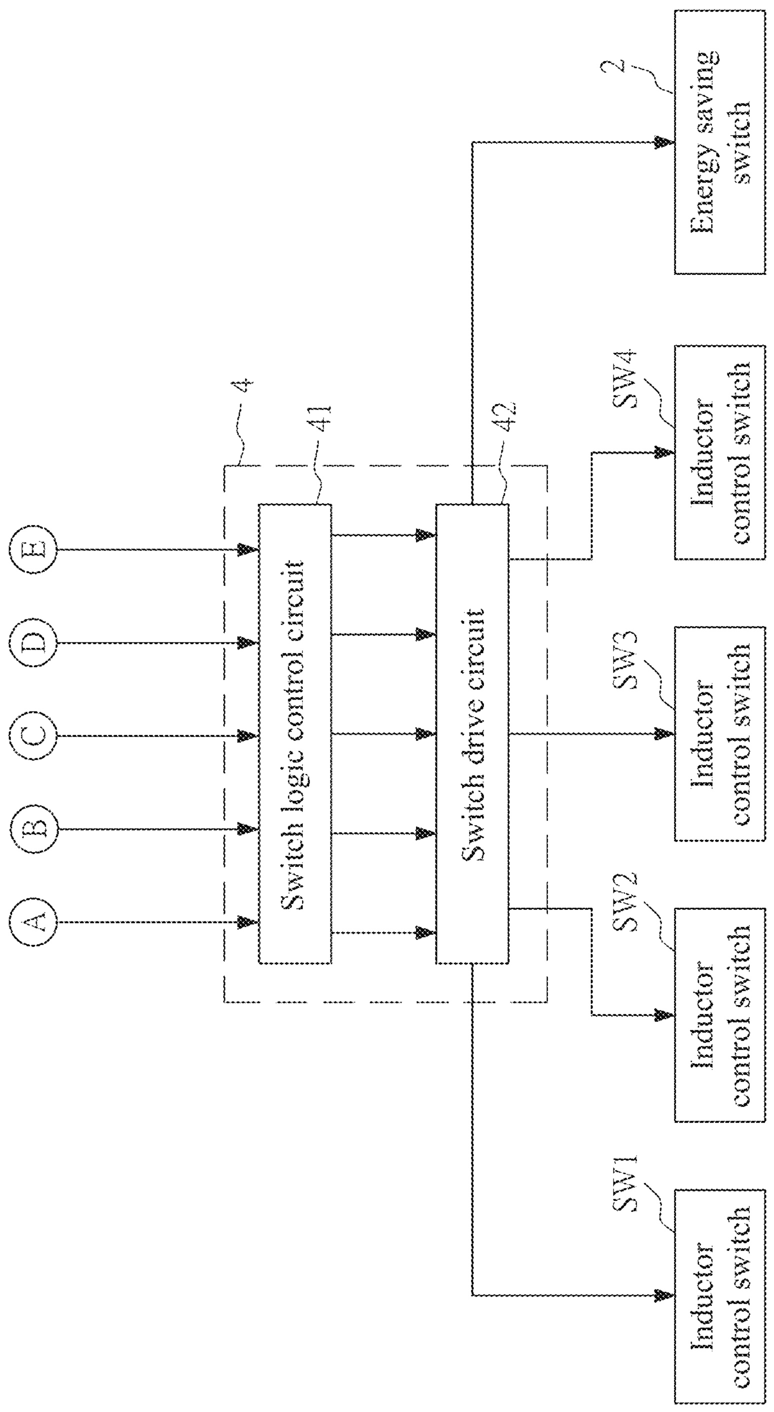

Referring to the FIGS. 3A and 3B, the FIGS. 3A and 3B are circuit diagrams illustrating the feedback control circuit with energy-saving operation mode provided by the present invention. As shown in the FIGS. 3A and 3B, the conversion control circuit 4 includes a switch logic control circuit 41 and a switch drive circuit 42. The switch logic control circuit 41 is electrically connected to the voltage detector 3 and the feedback control circuit 5 respectively, and is used to generate the switch off control command S3 and the switch on control command S4 according to the normal operation signal S1 and the energy-saving operation signal S2 respectively, and is used to generate the positive voltage control command S5 and the additional voltage control command S6 according to the feedback control signal S7.

The switch drive circuit 42 is electrically connected to the switch logic control circuit 41, the energy-saving switch 2 and the inductance control switches SW1 to SW4 respectively, and is used to drive the energy-saving switch 2 to turn off or on according to the switch off control command S3 and the switch on control command S4, and is used to drive the inductor control switches SW1 to SW4 to turn off or on according to the positive voltage control command S5 and the additional voltage control command S6.

In this embodiment, the feedback control circuit 5 includes a current detector 51, a ramp signal generator 52, a voltage divider resistor circuit 53, an error amplifier 54, an adder 55 and a comparator circuit 56. The current detector 51 is electrically connected to the inductor L and the switching logic control circuit 41 respectively, and is used to generate an inductor current detector output voltage Vdi when the inductor current IL is detected to be 0.

The ramp signal generator 52 is electrically connected to the inductor L and the comparator circuit 56 respectively, and includes a signal converter 521, a frequency generator 522 and an adder 523. In this embodiment, the ramp signal generator 52 converts the inductor current IL into a voltage signal through the signal converter 521, and then adds the voltage signal to a fixed frequency signal generated by the frequency generator 522 through the adder 523 to generate a ramp voltage Vramp.

The voltage divider resistor circuit 53 is electrically connected to the positive voltage output source 300, the additional voltage output source 301 and the error amplifier 54 respectively, and is used to convert the output positive voltage Vop and the additional output voltage Von into a feedback positive voltage Vpfb and a feedback negative voltage Vnfb respectively by using the internal resistor voltage divider. The error amplifier 54 is electrically connected to the voltage dividing resistor circuit 53, the adder 55 and the comparator circuit 56 respectively, and is used to convert the feedback positive voltage Vpfb into a positive operation voltage Vpo, and to convert the feedback negative voltage Vnfb into a negative operation voltage Vno.

The adder 55 is electrically connected to the error amplifier 54 and the comparator circuit 56 respectively, and is used to add the positive operation voltage Vpo and the negative operation voltage Vno to obtain an operation difference voltage Vpno. The comparator circuit 56 is electrically connected to the switch logic control circuit 41, the ramp signal generator 52, the error amplifier 54 and the adder 55, and includes three comparators 561 to 563.

The comparator 561 is used to generate a comparative positive voltage Vpc when the ramp voltage Vramp is greater than or equal to the operation positive voltage Vpo. The comparator 562 is used to generate a comparative difference voltage Vpnc when the ramp voltage Vramp is greater than or equal to the operation difference voltage Vpno. The comparator 563 is used to generate a comparative negative voltage Vnc when the ramp voltage Vramp is greater than or equal to the operation negative voltage Vno.

In summary, the feedback control circuit 5 generates the comparative positive voltage Vpc, the comparative difference voltage Vpnc and the comparative negative voltage Vnc by monitoring and controlling the inductor L, the positive voltage output source 300 and the additional voltage output source 301, and the feedback control circuit 5 sends the comparative positive voltage Vpc, the comparative difference voltage Vpnc and the comparative negative voltage Vnc to the switch logic control circuit 41 as the feedback control signal S7. The structures and working principles of the above mentioned current detector 51, ramp signal generator 52, voltage divider resistor circuit 53, error amplifier 54, adder 55 and comparator circuit 56 are all prior art and are not claimed by the present invention, so they will not be described again in this embodiment.

Figure 4:
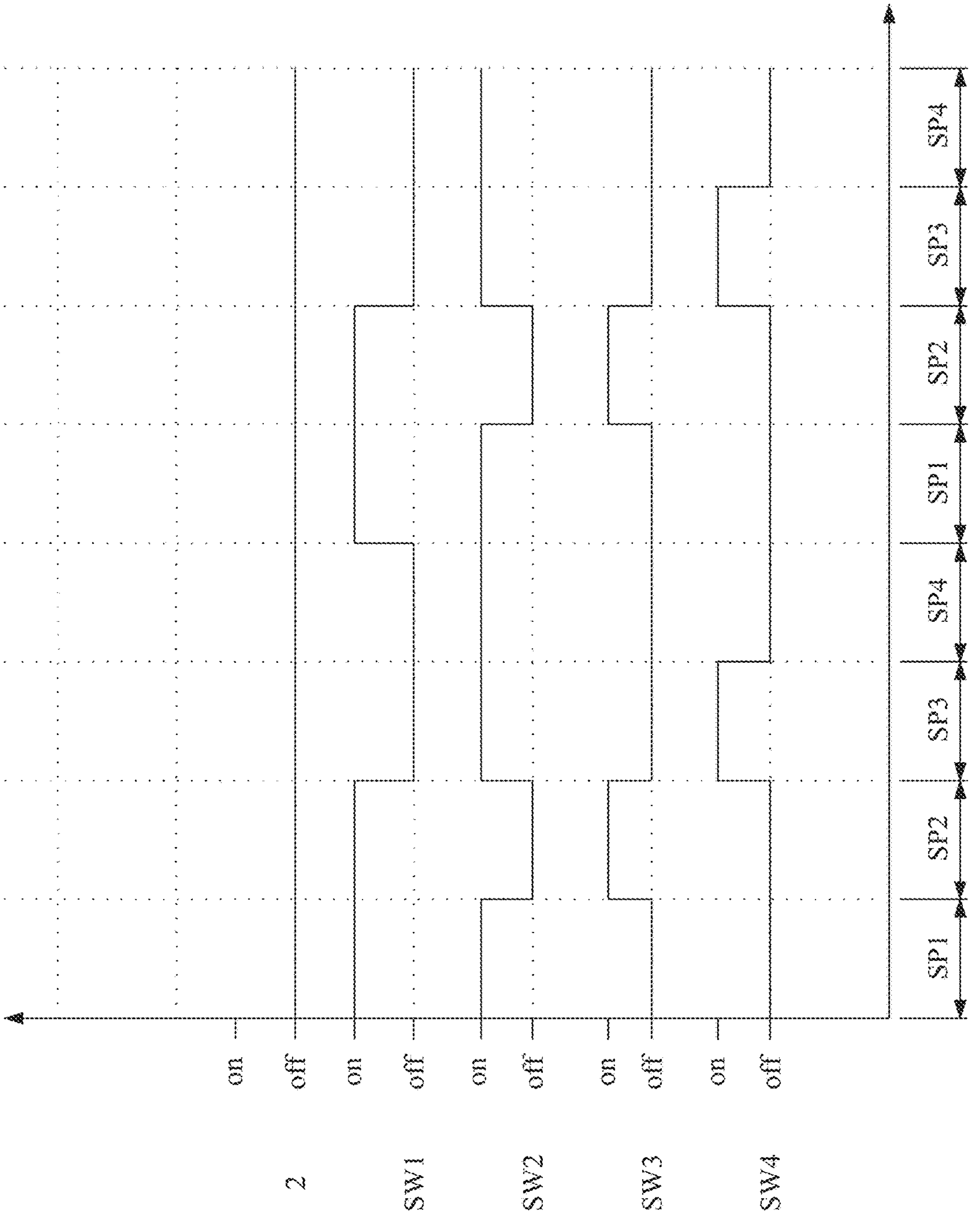
FIG. 4 illustrates the switch control sequence diagram of the single inductor multiple output converter with energy-saving operation mode provided by the present invention in the normal operation mode.
Figure 5:
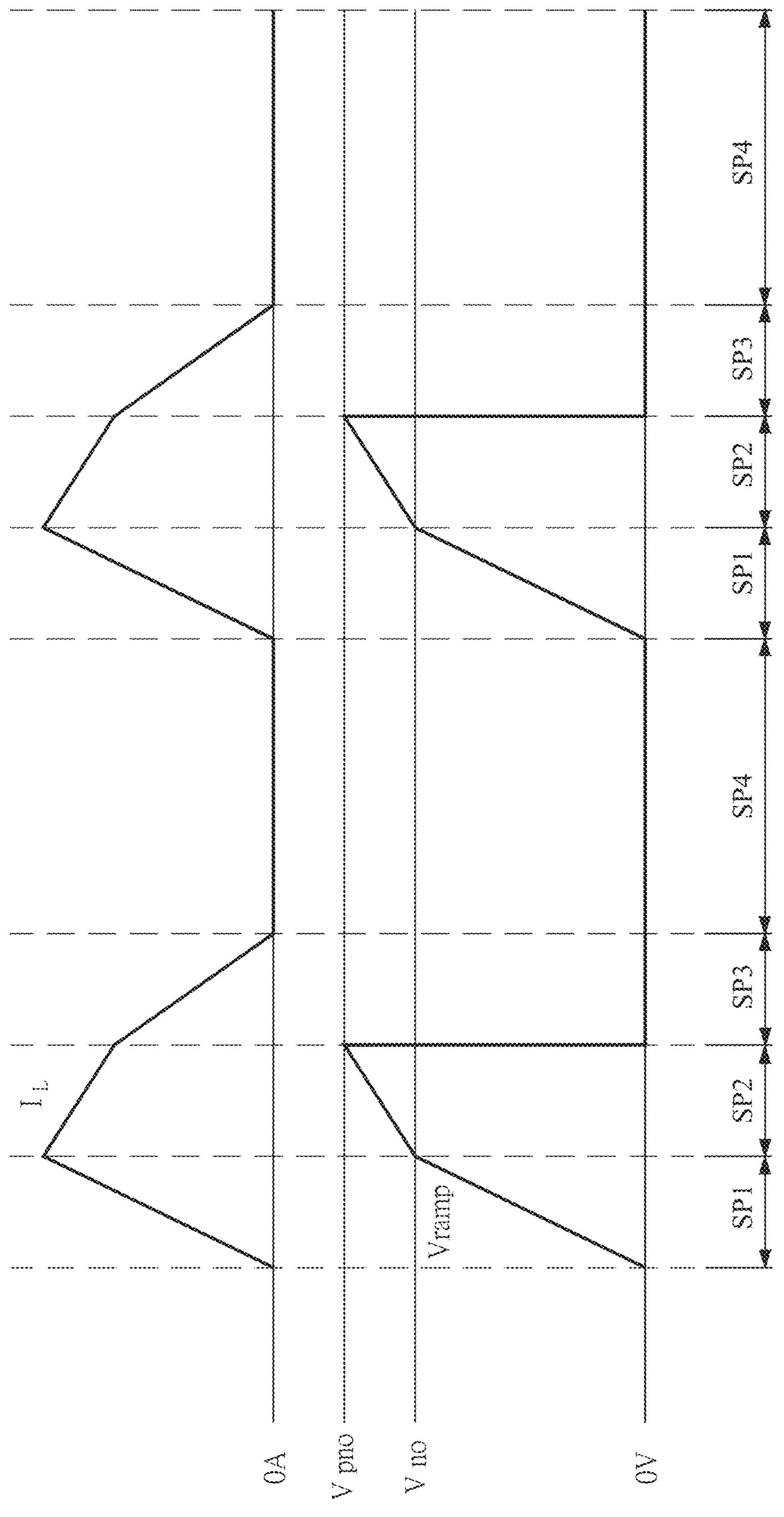
FIG. 5 illustrates the inductor current and slope voltage waveforms in normal operation mode of the single inductor multiple output converter with energy-saving operation mode provided by the present invention.
Figure 6:
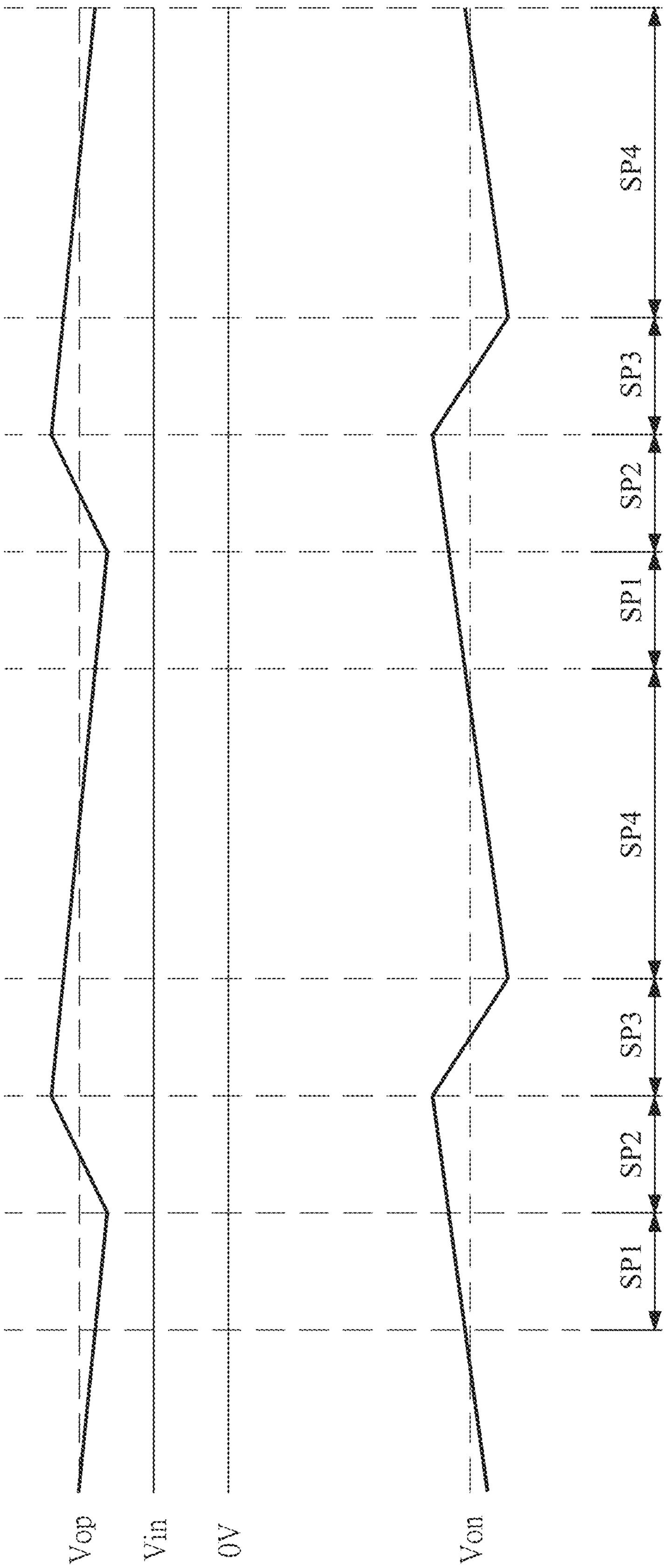
FIG. 6 illustrates the input and output voltage waveforms of the single inductor multiple output converter with energy-saving operation mode provided by the present invention in normal operation mode.

Referring to the FIGS. 4 to 6, the FIG. 4 illustrates the switch control sequence diagram of the single inductor multiple output converter with energy-saving operation mode provided by the present invention in the normal operation mode; the FIG. 5 illustrates the inductor current and slope voltage waveforms in normal operation mode of the single inductor multiple output converter with energy-saving operation mode provided by the present invention; and, the FIG. 6 illustrates the input and output voltage waveforms of the single inductor multiple output converter with energy-saving operation mode provided by the present invention in normal operation mode.

As shown in the FIGS. 4 to 6, in the normal operating mode, that is, when the input voltage Vin is less than the output positive voltage Vop, the energy-saving switch 2 remains turned off.

At this time, the inductor control switches SW1 to SW4 are controlled by the positive voltage control command S5 and the additional voltage control command S6, and are turned on or off to repeatedly charge and discharge the inductor L, thereby converting the input voltage Vin into the output positive voltage Vop and the additional output voltage Von. The positive voltage control command S5 includes a plurality of positive voltage control subcommands arranged according to a positive voltage control sequence. The additional voltage control command S6 includes a plurality of additional voltage control subcommands arranged according to an additional voltage control sequence.

In this embodiment, both the positive voltage control sequence and the additional voltage control sequence use four phases SP1 to SP4 as one control cycle to control the inductor control switches SW1 to SW4. In other words, the positive voltage control command S5 includes the first positive voltage control subcommand, the second positive voltage control subcommand, the third positive voltage control subcommand and the fourth positive voltage control subcommand, and corresponds to the four phases SP1 to SP4 respectively. The additional voltage control command S6 includes a first additional voltage control subcommand, a second additional voltage control subcommand, a third additional voltage control subcommand, and a fourth additional voltage control subcommand, and corresponds to the four phases SP1 to SP4 respectively. In addition, in this embodiment, the positive voltage control command S5 is used to control the inductor control switches SW2 and SW3, and the additional voltage control command S6 is used to control the inductor control switches SW1 and SW4.

In the phase SP1, the first positive voltage control subcommand is to control the inductor control the switch SW2 to be turned on. The first additional voltage control subcommand is to control the inductor control the switch SW1 to be turned on. At the same time, the inductor L continues to store electrical energy. When the ramp voltage Vramp continues to climb from 0 volts to the operation negative voltage Vno, the comparative negative voltage Vnc is HIGH (the ramp voltage Vramp is greater than or equal to the operation negative voltage Vno), and the phase SP1 ends at this point.

In the phase SP2, the second positive voltage control subcommand is to control the inductor control switch SW2 to be turned off, and controls the inductor control switch SW3 to be turned on. The second additional voltage control subcommand is to control the inductor control switch SW1 to continue to be turned on. At the same time, the output positive voltage Vop continues to rise. When the ramp voltage Vramp continues to climb to the operation difference voltage Vpno, the comparative difference voltage Vpnc is HIGH (the ramp voltage Vramp is greater than or equal to the operation difference voltage Vpno), and the phase SP2 ends at this point.

In the phase SP3, the third positive voltage control subcommand is to control the inductor control switch SW2 to be turned on, and controls the inductor control switch SW3 to be turned off. The third additional voltage control subcommand is to control the inductor control switch SW1 to be turned off, and control the inductor control switch SW4 to be turned on. At the same time, the additional output voltage Von continues to rise. When the inductor current IL gradually drops to 0, Vdi is HIGH, and the phase SP3 ends at this point.

In the phase SP4, the fourth positive voltage control subcommand is to control the inductor control switch SW2 to continue to be turned on, and control the inductor control switch SW3 to remain turned off. The fourth additional voltage control subcommand is to control the inductor control switch SW1 to remain turned off, and to control the inductor control switch SW4 to be turned off. After repeating the above phases SP1 to SP4, the single inductor multiple output converter 100 can continuously convert the input voltage Vin into the output positive voltage Vop and the additional output voltage Von in the normal operation mode.

In addition, since the output positive voltage Vop and the additional output voltage Von continue to change during output and are sawtooth wave voltages, the solid line in the FIG. 6 represents the actual voltage change, and the dotted line represents the average voltage change.

Figure 7:
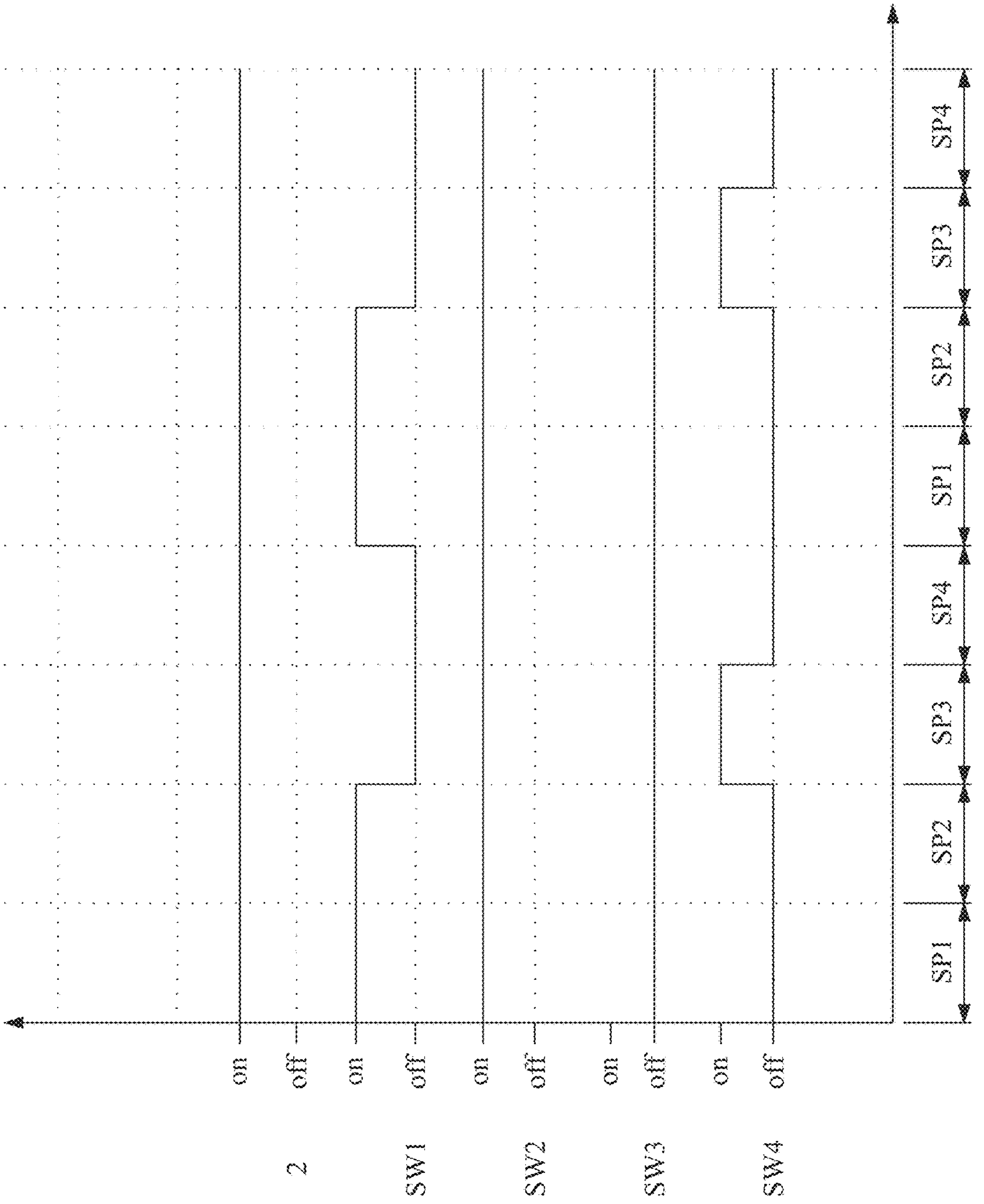
FIG. 7 illustrates the switch control sequence diagram of the single inductor multiple output converter with energy-saving operation mode provided by the present invention in the energy-saving operation mode.
Figure 8:
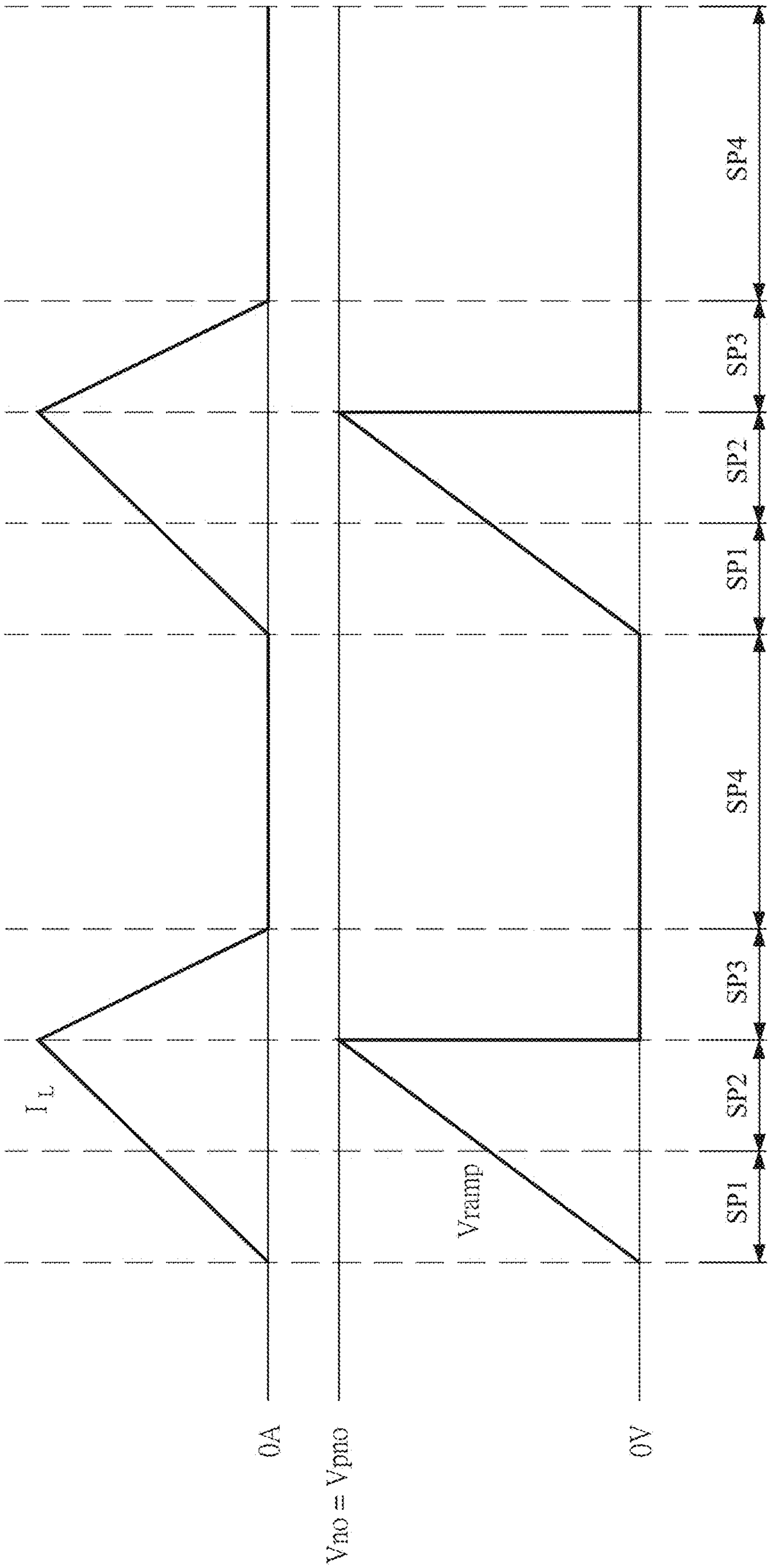
FIG. 8 illustrates the inductor current and slope voltage waveforms of the single inductor multiple output converter with energy-saving operation mode provided by the present invention in the energy-saving operation mode.
Figure 9:
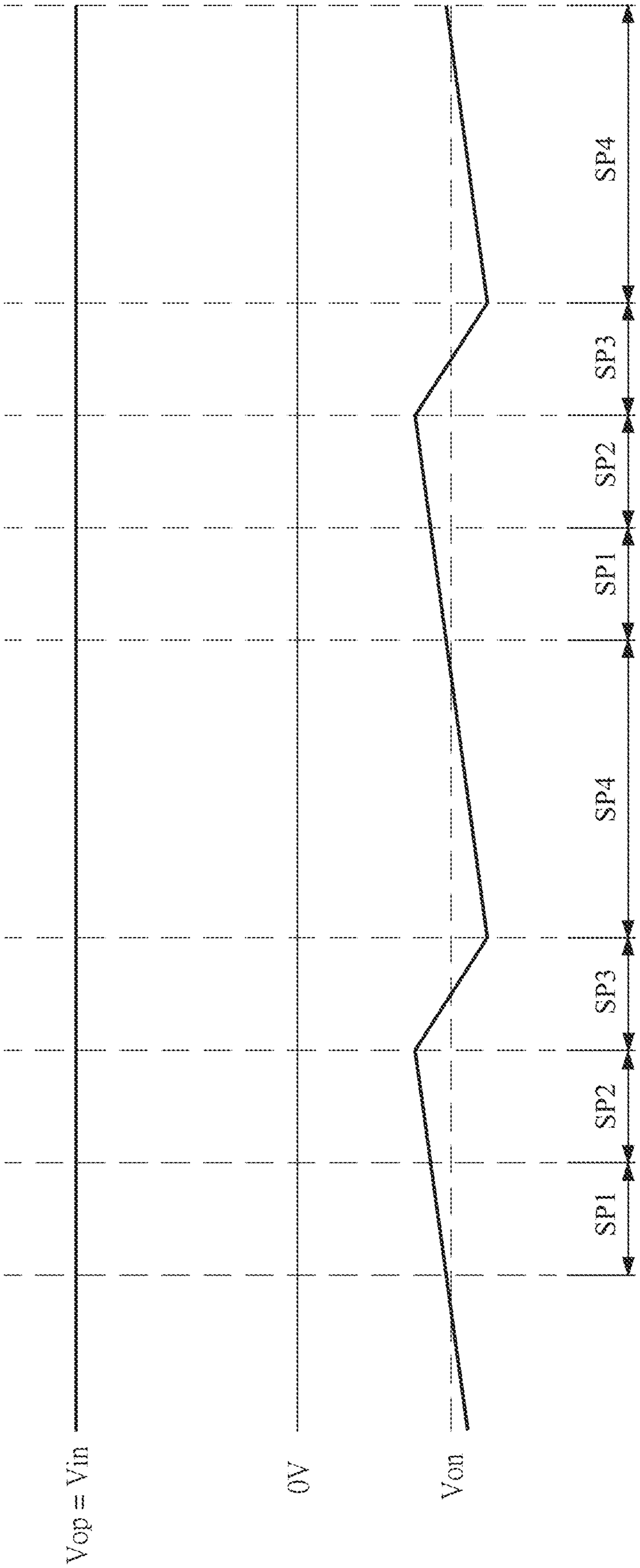
FIG. 9 illustrates the input and output voltage waveforms of the single inductor multiple output converter in the energy-saving operation mode provided by the present invention.

Refer to FIGS. 7 to 9, the FIG. 7 illustrates the switch control sequence diagram of the single inductor multiple output converter with energy-saving operation mode provided by the present invention in the energy-saving operation mode; the FIG. 8 illustrates the inductor current and slope voltage waveforms of the single inductor multiple output converter with energy-saving operation mode provided by the present invention in the energy-saving operation mode; and, the FIG. 9 illustrates the input and output voltage waveforms of the single inductor multiple output converter in the energy-saving operation mode provided by the present invention.

As shown in FIGS. 7 to 9, in the energy-saving operation mode, that is, when the input voltage Vin is greater than the output positive voltage Vop, the energy-saving switch 2 and the inductor control switch SW2 remain turned on.

At this time, the input voltage Vin is directly output to the positive voltage output source 300 as the output positive voltage Vop, and the inductor control switches SW1 and SW4 are turned on or off by the additional voltage control command to repeatedly charge and discharge the inductor L, thereby converting the input voltage Vin into the additional output voltage Von.

Since there is no need to convert the output positive voltage Vop through a single inductor conversion circuit in the energy-saving operation mode, there is no need to control the inductor control switches SW2 and SW3 in the phase SP2 to make the output positive voltage Vop continue to rise. That is, in the energy-saving operation mode, the switch state in the phase SP1 will continue until the end of the phase SP2.

In the phases SP1 and SP2, the first additional voltage control subcommand is to control the inductor control switch SW1 to be turned on. At the same time, the inductor L continues to store electrical energy. When the ramp voltage Vramp continues to climb from 0 volts to the operation negative voltage Vno or the operation difference voltage Vpno (in the energy-saving operation mode, the operation negative voltage Vno and the operation difference voltage Vpno are equal), the comparative negative voltage Vnc and the comparative difference voltage Vpnc are both HIGH (the ramp voltage Vramp is greater than or equal to the operation negative voltage Vno or the operation difference voltage Vpno), and the phases SP1 and SP2 end at this point.

In the phase SP3, the third additional voltage control subcommand is to control the inductor control switch SW1 to be turned off, and control the inductor control switch SW4 to be turned on. At the same time, the additional output voltage Von continues to rise. When the inductor current IL gradually drops to 0, Vdi is HIGH, and the phase SP3 ends at this point.

In the phase SP4, the fourth additional voltage control sub-command is to control the inductor control switch SW1 to remain turned off, and control the inductor control switch SW4 to be turned off. After repeating the above phases SP1 to SP4, the single inductor multiple output converter 100 can continuously convert the input voltage Vin into the output positive voltage Vop and the additional output voltage Von in the energy-saving operation mode. In addition, since the additional output voltage Von continuously changes during output and is a sawtooth wave voltage, therefore, the solid line in FIG. 9 represents the actual voltage change, and the dotted line represents the average voltage change.

Refer to the FIGS. 4 and 7, in the normal operation mode, the single inductor conversion circuit 1 executes the positive voltage control command S5 and the additional voltage control command S6 to convert and obtain the output positive voltage Vop and the additional output voltage Von. and, in the energy-saving operation mode, the single inductor conversion circuit 1 only needs to execute the additional voltage control command S6 to convert and obtain the additional output voltage Von, and input the voltage Vin directly as the output positive voltage Vop.

That is, within a control cycle (including the phases SP1 to SP4), the inductor control switches SW1 to SW4 in the energy-saving operation mode have fewer switching times. Since in the circuit structure, every switching of switches will cause inevitable power loss, therefore, reducing the number of switch switching times can effectively save energy and improve power conversion efficiency.

Base on the above, in the single inductor multiple output converter 100 provided by the present invention, when the input voltage Vin is greater than or equal to the output positive voltage Vop, the energy-saving switch 2 is turned on to directly output the input voltage Vin as the output positive voltage Vop, thereby reducing the number of switching times of the inductor control switches SW1 to SW4 within a control cycle, thereby solving the above problems.

While the present invention has been particularly shown and described with reference to a preferred embodiment, it will be understood by those skilled in the art that various changes in form and detail may be without departing from the spirit and scope of the present invention.

What is claimed is:

1. A single inductor multiple output converter with an energy-saving operation mode used to convert an input voltage of a voltage input source into an output positive voltage and at least one additional output voltage lower than the output positive voltage, and then outputting the output positive voltage and the at least one additional output voltage to a positive voltage output source and at least one additional voltage output source respectively, comprising:

a single inductor conversion circuit electrically connected to the voltage input source, the positive voltage output source and the additional voltage output source, for converting the input voltage into the output positive voltage and the at least one additional output voltage;

an energy-saving switch electrically connected to the voltage input source and the positive voltage output source respectively, and used to directly output the input voltage as the output positive voltage to the positive voltage output source when the energy-saving switch is turned on; and a voltage detector electrically connected to the voltage input source and the positive voltage output source respectively, for sending a normal operation signal when the input voltage is detected to be less than the output positive voltage, and for sending an energy-saving operation signal when the input voltage is detected to be greater than or equal to the output positive voltage, and, in the normal operation mode, after issuing a switch turn-off control command to turn off the energy-saving switch, sending a positive voltage control command and at least one additional voltage control command to the single inductor conversion circuit, and, in the energy-saving operation mode, after issuing a switch turn-on control command to turn on the energy-saving switch, sending the at least one additional voltage control command to the single inductor conversion circuit;

wherein, in the normal operation mode, the single inductor conversion circuit operates according to the positive voltage control command and the at least one additional voltage control command, and outputs the output positive voltage and the at least one additional output voltage to the positive voltage output source and the at least one additional voltage output source respectively; and, in the energy-saving operation mode, the input voltage is directly output to the positive voltage output source as the output positive voltage, and the single inductor conversion circuit operates according to the at least one additional voltage control command, and outputs the at least one additional output voltage to the at least one additional voltage output sources.

2. The single inductor multiple output converter with the energy-saving operation mode of claim 1, further comprising:

a plurality of voltage regulators, and a plurality of loads electrically connected to the voltage regulators, wherein the plurality of voltage regulators are electrically connected to the positive voltage output source and the at least one additional voltage output source respectively to reduce ripples generated during operation.

3. The single inductor multiple output converter with the energy-saving operation mode of claim 2, wherein the plurality of voltage regulators are all LDR (Low-Dropout Regulator).

4. The single inductor multiple output converter with the energy-saving operation mode of claim 1, further comprising:

a plurality of voltage stabilizing capacitors used for filtering or eliminating high-frequency noise, or for storing energy.

5. The single inductor multiple output converter with the energy-saving operation mode of claim 1, wherein the single inductor conversion circuit comprises an inductor and a plurality of inductor control switches, the inductor has a current inflow side and a current outflow side, during operation, an inductor current flows from the current inflow side to the current outflow side, and, the plurality of inductor control switches are controlled to be turned on or off to repeatedly charge and discharge the inductor, thereby converting the input voltage into the output positive voltage and the at least one additional output voltage.

6. The single inductor multiple output converter with the energy-saving operation mode of claim 5, further comprising:

a feedback control circuit electrically connected to the single inductor conversion circuit, the conversion control circuit, the positive voltage output source and the additional voltage output source respectively, for sending a feedback control signal to the conversion control circuit.

7. The single inductor multiple output converter with the energy-saving operation mode of claim 6, wherein the conversion control circuit comprises a switching logic control circuit and a switch drive circuit, the switch logic control circuit is electrically connected to the voltage detector and the feedback control circuit respectively, and is used to generate the switch off control command and the switch on control command respectively according to the normal operation signal and the energy saving operation signal, and to generate the positive voltage control command and the at least one additional voltage control command according to the feedback control signal, and the switch drive circuit is electrically connected to the switch logic control circuit, the energy-saving switch and the inductance control switches respectively, and is used to drive the energy-saving switch to be turned off or on according to the switch off control command and the switch on control command, and to drive the inductor control switches to be turned off or on according to the positive voltage control command and the at least one additional voltage control command.

8. The single inductor multiple output converter with the energy-saving operation mode of claim 1, wherein the positive voltage control command includes a plurality of positive voltage control subcommands arranged according to a positive voltage control sequence, and the at least one additional voltage control command includes a plurality of additional voltage control subcommands arranged according to at least one additional voltage control sequence.

* * * * *